United States Patent [19]

Wolfrum

[11] Patent Number: 4,546,011
[45] Date of Patent: Oct. 8, 1985

[54] METHOD OF AND APPARATUS FOR MAKING AN ADHESIVE-COATED ROLL

[75] Inventor: Emil Wolfrum, Forchheim, Fed. Rep. of Germany

[73] Assignee: Gebrauchs Gerate GmbH, Kriftel, Fed. Rep. of Germany

[21] Appl. No.: 559,193

[22] Filed: Dec. 7, 1983

Related U.S. Application Data

[62] Division of Ser. No. 357,217, Mar. 11, 1982, Pat. No. 4,427,726.

[30] Foreign Application Priority Data

Mar. 21, 1981 [DE] Fed. Rep. of Germany ....... 3111150

[51] Int. Cl.$^4$ .......................... B05D 3/12; B05D 5/08; B05D 5/10; B05C 1/16
[52] U.S. Cl. ..................................... 427/179; 118/37; 118/211; 427/208.6; 427/289; 427/290
[58] Field of Search ...................... 427/208.6, 289, 290, 427/179; 118/37, 40, 211, 212

[56] References Cited

U.S. PATENT DOCUMENTS

| | | | |
|---|---|---|---|
| 2,173,989 | 9/1939 | Wilbur | 428/194 X |
| 2,764,501 | 9/1956 | Perri | 428/43 |
| 4,119,452 | 10/1978 | Stolpe et al. | 118/37 X |

FOREIGN PATENT DOCUMENTS 464884 4/1937 United Kingdom ................ 118/211

Primary Examiner—Evan K. Lawrence
Attorney, Agent, or Firm—Peter K. Kontler

[57] ABSTRACT

A web of crepe paper, thin plastic foil or like material convoluted into a roll has an outer side which is provided with a continuous coat of adhesive. Transversely extending, uniformly spaced weakened portion in the form of perforations or slits are formed in the web, and layers of a material which does not adhere to the adhesive are applied to the web. Such layers are applied to the inner side of the web so that they flank the weakened portions and allow for rapid engagement of the leader of the web by two fingers when the user wishes to remove one or more sections or panels between neighboring weakened portions. The roll can be used for the cleaning of garments or for analogous purposes and can be made in an apparatus wherein the application of layers of non-adherent material precedes or follows the making of weakened portions. The length of each layer, as considered in the longitudinal direction of the web, is a small fraction, preferably less than one-third, of the distance between two neighboring weakened portions.

9 Claims, 2 Drawing Figures

U.S. Patent   Oct. 8, 1985   4,546,011
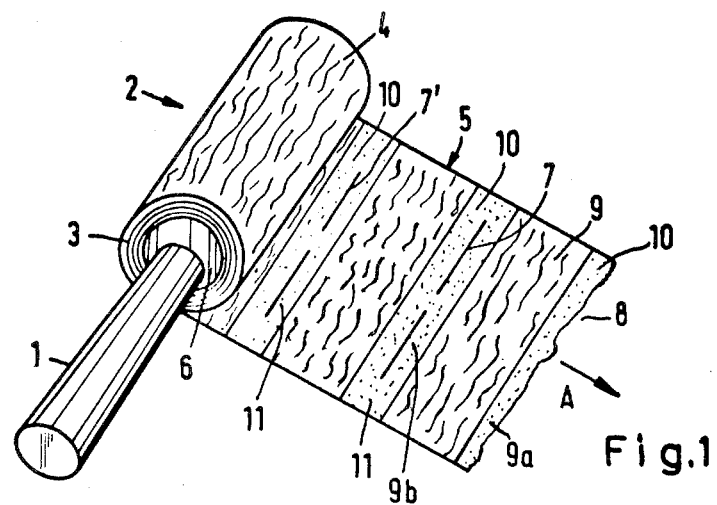
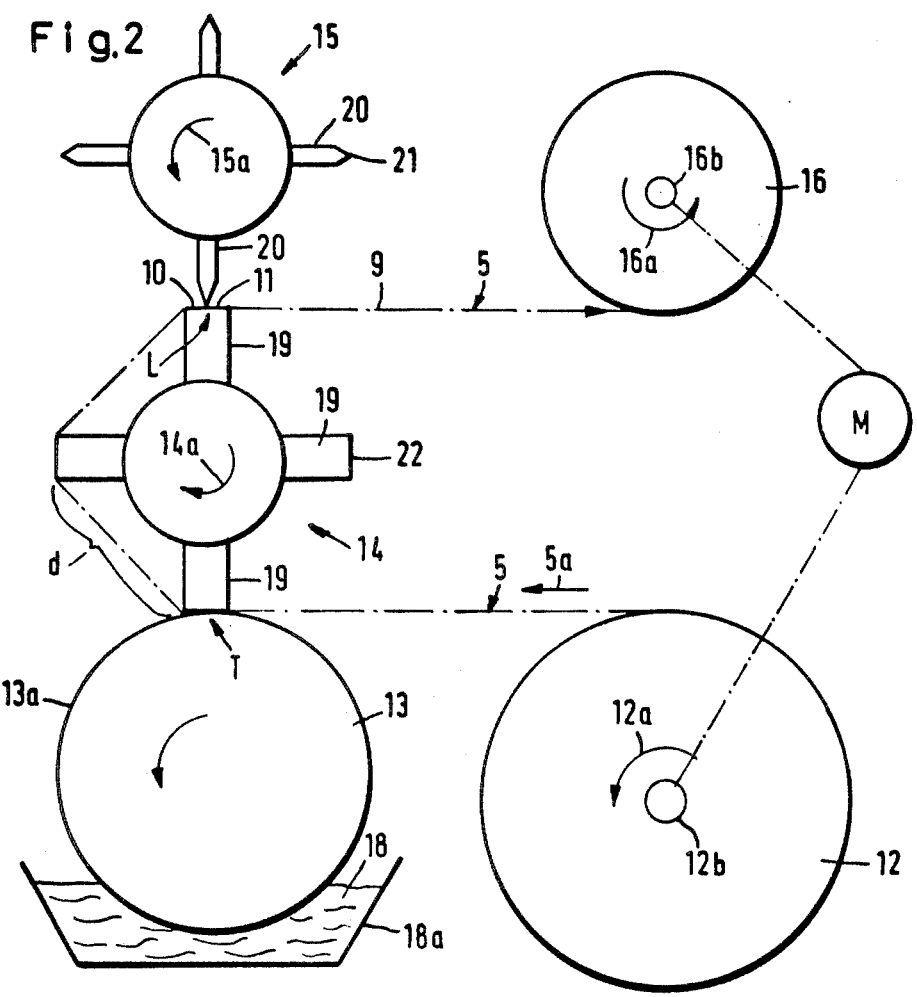

METHOD OF AND APPARATUS FOR MAKING AN ADHESIVE-COATED ROLL

This application is a division of application Ser. No. 357,217, filed Mar. 11, 1982 now U.S. Pat. No. 4,427,726.

BACKGROUND OF THE INVENTION

The invention relates to a method of and an apparatus for making rolled up or convoluted adhesive-coated bands, strips, webs or similar elongated flexible bodies. More particularly, the invention relates to a method of and an apparatus for making rolls of adhesive-coated material (hereinafter called webs) which can be utilized with advantage for the cleaning of garments, e.g., for removal of lint.

It is already known to form a garment cleaning roll by convoluting a web of crepe paper or an analogous flexible strip material around a core or the like and to provide one side of the web with a coat of adhesive. It is also known to provide the web with transversely extending rows of perforations which weaken the respective portions of the web so that the contaminated or otherwise spent portions or sections of the web can be readily segregated from the next-following satisfactory or intact portions. As a rule, the weakened portions are equidistant from one another so that the user can segregate sections or panels of predetermined length, as considered in the longitudinal direction of the convoluted material.

A drawback of heretofore known rolls of convoluted web material one side of which is coated with adhesive is that, when the user has completed the separation of a preceding section or panel from the remainder of the web, the leader of the remainder adheres to the convolution therebelow. This takes place irrespective of whether the adhesive coat is applied to the inner or to the outer side of the convoluted web. In other words, a fresh leader which is obtained on detachment of one or more foremost or outermost sections will tend to adhere to the section or sections which are overlapped thereby so that the person using the roll encounters problems in attempting to grasp the leader preparatory to detachment of one or more additional sections, e.g., preparatory to detachment of sections whose outer sides are covered with lint so that they must be removed for the purpose of exposing fresh adhesive-coated portions of the roll. The situation is aggravated when the web is very thin, e.g., when the web consists of relatively thin crepe paper or extremely thin plastic foil. As a rule, such types of rolls are sold or furnished with operating instructions containing a recommendation that the leader of the web be folded over, either along its entire width or at one of the corners, i.e., to form a flap which can be more readily grasped by fingers when the user wishes to unwind one or more sections preparatory to detachment of such sections from the remainder of the convoluted web. Operating instructions are often misplaced and/or disregarded by the purchaser of the roll; at any rate, the preparation of such instructions involves additional costs for paper, printing and shipment. Furthermore, the just discussed making of flaps is of no help when the adhesive is applied to the outer side of the convoluted roll because the folded flap adheres to the adjacent portion of the outer side and cannot be readily grasped when the user desires to detach one or more sections at the leading end of the web.

OBJECTS AND SUMMARY OF THE INVENTION

An object of the invention is to provide a method of and apparatus for making a roll which consists of a convoluted web of flexible strip material and which is produced in such a way that the user can invariably grasp the leader of the convoluted material for the purpose of conveniently detaching one or more sections therefrom.

Another object of the invention is to provide a method of and an apparatus for making a roll of the just outlined character which can be properly manipulated by the user without any operating instructions or training.

A further object of the invention is to provide a method of and an apparatus for making a roll which is constructed and assembled in such a way that a readily accessible portion of the web is available in automatic response to detachment of one or more sections at the leading end of the convoluted web.

An additional object of the invention is to provide a method of and an apparatus for making a roll which can be manipulated in a simple, efficient and time-saving manner irrespective of the nature of its material, i.e., regardless of whether the web consists of a relatively stiff, readily flexible or extremely thin and highly flexible strip material.

A further object of the invention is to provide a simple and inexpensive method of making a roll wherein the leader of the convoluted adhesive-coated web is invariably accessible to allow for convenient removal of one or more sections from the roll.

A further object of the invention is to provide a simple and compact apparatus which can be used for the making of rolls consisting of a web of flexible material one side of which is coated with adhesive and which nevertheless allows for convenient grasping of the leader of the convoluted web without the making of folded-over flaps or the like.

The invention resides in a method of and an apparatus for making a roll, particularly a roll for cleaning garments or the like, which comprises an elongated convoluted flexible web having an inner side, an outer side and a plurality of at least substantially equidistant transversely extending weakened portions in the form of rows of perforations, slits, pronounced creases or a combination of these along which the web breaks in response to the application of tensional stresses and which divide the web into a file of neighboring sections or panels each having a leader adjacent to the preceding weakened portion and a trailing portion adjacent to the next-following weakened portion, an adhesive coat provided at one side of the web (e.g., at the outer side of the web), and a plurality of substantially strip-shaped layers or films consisting of a material which does not adhere to the adhesive at the one side of the web and being provided at the inner sides of the leaders of the sections so that the leaders do not adhere to the adhesive at the one side of each of the sections which are in overlapping relationship therewith. The width of each layer, as considered in the longitudinal direction of the web, is preferably a small fraction (most preferably less than one-third) of the distance between two neighboring weakened portions, i.e., the width of a layer is preferably less than one-third of the width of a section, as viewed in the longitudinal direction of the convoluted web.

The layers preferably extend all the way to the respective preceding weakened portions (this further reduces the likelihood of adherence of the leaders to the sections which are overlapped thereby). It is further preferred to provide a plurality of second strip-shaped layers consisting of a material which does not adhere to the adhesive-coated side of the web and being provided at the inner sides of the trailing portions of the sections so that the trailing portions do not adhere to the adhesive at the one side of each of the sections which are in overlapping relationship therewith. The width of each second layer preferably approximates or matches the width of a first-mentioned layer, and each weakened portion is preferably flanked, at both sides, by the material of the respective layers so that the width of the composite layer which does not accept and does not adhere to adhesive is actually twice the width of a single layer and the weakened portion is completely surrounded by the non-adherent material, i.e., by a material which will not stick to the adhesive-coated side of the web. The material of the second layers can be or is identical with the material of the first-mentioned layers. Such material can consist of or contain stearin, wax, wax crayon and/or silicone.

In many instances, the web will consist of crepe paper or thin plastic foil. The weakened portions may include perforations, rows of slits, pronounced creases or a combination of two or all three such features.

The presently preferred method of making the above-discussed roll comprises the steps of weakening spaced-apart portions of the web transversely of the longitudinal direction of the web so that the thus weakened portions break first in response to the application of tensional stresses to corresponding regions of the web and such weakened portions convert the web into a file of coherent neighboring sections each having a leader adjacent to the preceding weakened portion and a trailing portion adjacent to the next-following weakened portion, and applying to the inner sides of the sections transversely extending layers consisting of a material which does not adhere to the adhesive coat at the one side of the web. The layers are applied to the trailing portion and/or to the leader of each section, and one of the aforementioned (weakening and applying) steps precedes the other step, i.e., the weakening operation can be completed before the application of the aforementioned layers or vice versa. The one side of the web can be coated with adhesive prior or subsequent to completion of the weakening and/or applying steps. The operation may be such that the application of the layers precedes by one, two or more steps the making of the weakened portions, i.e., that layers of a hardenable liquid substance (consisting of or containing silicone, stearin, wax, wax crayon or an equivalent material) are applied to spaced-apart portions of the inner side of the web while the web is running along a predetermined path, and the making of the weakened portions takes place at a location or station downstream of the locus or station for the application of the layers, e.g., so that one or more layers are disposed between the weakening tool or tools and the station for application of liquid material and the length of web between the two stations carries one or more layers, depending on the speed of the web and the interval of time which is needed to cause the material of the non-adherent layers to set (in part or entirely) prior to weakening of a selected region (preferably the central part) of a layer or a region which is immediately adjacent to a layer (depending upon whether each weakened portion is to be flanked by two layers of non-adherent material or is merely adjacent to a single layer).

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of a roll which is produced in accordance with the invention; and FIG. 2 is a diagrammatic side elevational view of an apparatus which can be utilized for the making of the improved roll and for the practice of the improved method.

DESCRIPTION OF THE PREFERRED EMBODIMENTS

Referring first to FIG. 1, there is shown a roll 2 which is mounted on an elongated handle 1 and includes a hollow cylindrical core (not visible) and a supply of convoluted web 5, e.g., a web consisting of crepe paper or the like. The core can be made of a stiff cardboard and is rotatably mounted between two flanges 6 (only one can be seen in FIG. 1) which are supported by the handle 1. The diameter of the illustrated handle 1 increases in a direction away from the respective axial end of the roll 2. The entire outer side of the convoluted web 5 is coated with an adhesive 4 so that, when the convoluted web is rolled along a garment (while the operator grasps the handle 1), the adhesive at the outer side of the outermost convolution collects lint and/or similar impurities which tend to adhere to the textile material. It will be appreciated that the just discussed utilization of the improved roll is but one of numerous uses to which the roll can be put without departing from the spirit of the invention.

The reference character 3 denotes the convolutions of the web 5; such convolutions surround the core and adhere to each other in view of the provision of adhesive coat 4 at the outer side of the web 5. This holds the convolutions 3 against unwinding or clockspringing. The non-illustrated flange 6 is readily removable so that the core of an exhausted roll 2 can be slipped off the handle 1 and replaced with the core of a fresh roll.

The web 5 is formed with transversely extending elongated linear or substantially linear weakened portions 7 in the form of rows of slits, perforations, pronounced creases or a combination of such features. All that counts is to ensure that, when the web section ahead of a weakened portion 7 is subjected to tensional stresses (e.g., to a pull in the direction indicated by arrow A), the web 5 readily breaks along the respective weakened portion 7 so that the operator is capable of determining the length of the separated part of the web as well as of ensuring that the break is regular (the neighboring weakened portions 7 are preferably equidistant from one another and preferably extend at right angles to the longitudinal direction of the web 5, i.e., in parallelism with the axis of the roll 2).

In order to ensure that the leader 9a of each section 9 between a pair of neighboring transversely extending weakened portions 7 will not adhere to the adhesive coat 4 at the outer side of the section or sections 9 therebelow, the improved roll 2 is provided with transversely extending strip-shaped layers 10 of a material (such as a substance consisting of or containing stearin, wax, wax crayon and/or silicone) which does not adhere to the adhesive coat 4. The layers 10 are applied to the inner side of the web 5 so that they face the adhesive 4 on the convolutions 3 therebelow and they extend all the way to the respective weakened portions 7. This guarantees that, when the web 5 is caused to break along a weakened portion 7, the web material which is immediately adjacent to the weakened portion 7 does not adhere to the adjacent adhesive coat 4 but is readily engageable by two or more fingers to allow for removal of one or more further sections 9 when the need for such removal arises. Moreover, it is not necessary to fold a portion of the foremost or outermost section 9 along the preceding weakened portion (i.e., along the leader of the remainder of the web 5) as was necessary in heretofore known rolls. This saves time and ensures that a forgetful operator need not peel off the leader of the foremost section 9 at the time when the need for removal of one or more sections arises, e.g., while the operator holds the handle 1 and must rapidly remove one or more spent sections 9 in order to expose a convolution having an intact adhesive-coated outer side.

In accordance with the presently preferred mode of making the improved roll, the inner side of the web 5 is provided with additional layers 11 whose material is preferably identical with that of the layers 10 and which are applied to the inner sides of the trailing portions 9b of the sections 9. This ensures that each of the weakened portions 7 is flanked by two elongated strip-shaped layers 10, 11, i.e., that each weakened portion is completely surrounded by a material which does not adhere to the adhesive coat 4. The placing of weakened portions 7 into immediate proximity of uncoated parts of the inner side of the web 5 (i.e., immediately adjacent to such parts which readily adhere to the adhesive coat 4 at the outer side of the web) could lead to smearing of some adhesive across the weakened portions 7 and would thus interfere with convenient access to the leaders 9a of foremost sections 9 preparatory to detachment of one or more sections from the remainder of the convoluted web 5. The width of each layer 10 may approximate or match the width of the neighboring layer 11, and the width of each such layer is preferably a small fraction of the width of a section 9 (as considered in the longitudinal direction of the web 5). At the present time, the width of a layer 10 or 11 is preferably less than one-third of the width of a section 9, i.e., less than one-third of the distance between two neighboring weakened portions 7. FIG. 1 shows that the combined width of a pair of neighboring layers 10, 11 can equal approximately one-third of the width of a section 9, and that the width of a layer 10 or 11 can be less than one-fourth of the width of a section. As will be explained with reference to FIG. 2, two neighboring layers 10, 11 are preferably applied in the form of a single layer whose width matches the combined width of a layer 10 and a layer 11, and the respective weakened portion 7 can be applied prior or subsequent to application of such relatively wide layers to the inner side of the web 5.

In peeling the two foremost sections 9 off the roll 2, the operator grasps the layer 10 which is immediately adjacent to the leading edge 8 of the web 5 (i.e., to the destroyed or broken foremost weakened portion 7) and pulls the foremost section 9 tangentially of the roll. A selected weakened portion 7 will readily break in response to the application of a twisting force in the region of the selected weakened portion or in response to the application of a pronounced tensional stress in the longitudinal direction of the web; such stress suffices to destroy a weakened portion 7 but does not result in tearing of a section 9 between the respective weakened portions. Since the foremost layer 10 does not adhere to the adhesive coat 4 therebelow, it can be readily lifted by one or more fingernails preparatory to exertion of a pull in a direction tangentially of the roll 2, i.e., prior to detachment of the central portion(s) of one or more sections 9 from the adhesive-coated outer side of the convolution 3 therebelow.

The layers 11 are optional; however, they are desirable and advantageous because they reduce the likelihood of adherence of the web 5, in the region of weakened portions 7, to the adhesive coat 4 therebelow. Furthermore, and as will be explained in connection with FIG. 2, the application of layers 11 simultaneously with the application of layers 10 simplifies the coating of the inner side of the web 5 with a material which does not adhere to the coat 4.

As mentioned above, the improved roll can be put to a number of different uses, and is not limited to the cleaning of garments or the like. It is further possible to apply the layers 11 and/or 10 as well as the adhesive coat 4 to one and the same side of the web 5, namely, to the inner side of the web. In such rolls, the layers 11 and/or 10 are applied to the inner side first and the adhesive coat is thereupon applied to the entire inner side whereby such coat adheres to the web portions between the neighboring layers (i.e., to the major central portions of the inner sides of the sections 9) but not to the layers 11 and/or 10. The aforementioned substances which can be used for the making of the layers 11 and/or 10 ensure that such layers do not adhere to the outer side of the web when the latter is convoluted to form a roll, and that the adhesive which is applied thereover does not adhere to the layers during coating of the inner side of the web.

Stearin or a substance which contains stearin is one of the presently preferred materials for the making of the layers 11 and/or 10. Stearin exhibits the advantage that it can be readily liquefied and its viscosity is then sufficiently low to allow for convenient and uniform application to selected portions (namely, to the trailing portions and/or leaders) of the sections 9. Furthermore, once the liquefied stearin sets, it adheres to the web 5 and its exposed surface does not accept and does not adhere to adhesive coats at normal temperatures (such as room temperature). It has been found that layers of stearin readily repel an adhesive coat which is applied thereover and that such layers also fail to adhere to the adhesive-coated side of the web.

The exact composition of the adhesive coat 4 forms no part of the invention. It can be the same as or similar to that at the inner side of Scotch Tape.

FIG. 2 shows a presently preferred form of an apparatus which can be utilized for the making of rolls of the type shown in FIG. 1. The apparatus comprises a source of supply 12 of web 5 (the illustrated source is a supply reel which pays out the web in the direction indicated by arrow 5a). The web 5 is caused to advance along a predetermined (substantially U-shaped) path to a takeup reel 16 whose shaft 16b is driven to rotate in the direction of arrow 16a. The adhesive coat 4 can be applied to the outer side of the web 5 prior to placing of the supply reel 12 onto its shaft 12b or subsequent to convolution of the web 5 onto the core of the reel 16, for example, during rewinding of the web 5 from the reel 16 onto the reel 12. To this end, the motor M which drives the shaft 16b in the direction of arrow 16a can be a reversible motor which can further serve to drive the shaft 12b of the reel 12 counter to the direction indicated by arrow 12a.

A heated vessel 18a contains a supply of a hardenable or settable liquid material 18 which is the material of the layers 10 and 11. The means for applying layers 10, 11 to selected portions of the running web 5 comprises a rotary roller-shaped applicator 13 which is driven in synchronism with the reels 12, 16 (for example, by the running web 5). A portion of the peripheral surface 13a of the applicator 13 dips into the liquid material 18 in the vessel 18a so that the entire peripheral surface 13a is coated with a film of material 18 when the web 5 is in motion to advance toward the reel 16. The applicator 13 cooperates with a cruciform rotary web contacting or engaging element 14 having four equidistant radially extending arms 19 whose radially outermost end surfaces or countersurfaces are shown at 22. The width of each such surface matches the combined width of a layer 10 and a layer 11, as considered in the longitudinal direction of the running web 5. The central portion of the element 14 can be driven by a discrete prime mover in synchronism with the applicator 13 so that the speed of the surfaces 22 matches the speed of the surface 13a, or in response to forward movement of the web 5. The surfaces 22 of the arms 19 cooperate with a rotary web-weakening device 15 having four equidistant radially extending tools in the form of knives 20 with edges 21 extending transversely of the web 5 and designed to form weakened portions of the type shown at 7 in FIG. 1. Thus, each of the edges 21 can have two or more spaced-apart cutting portions, depending on the number of perforations or slits in a weakened portion 7. The devices 14 and 15 respectively rotate in the directions indicated by arrows 14a and 15a and at such speeds that the speed of the edges 21 (which travel along a first circular path) is identical with the speed of surfaces 22 (which travel along a second circular path). The two paths contact each other at a location L which is the station for the making of weakened portions 7. The orientation of the device 15 relative to the element 14 is such that each edge 21 engages the web 5 substantially midway between the longer sides of the oncoming surface 22 (namely, midway between those sides which extend at right angles to the plane of FIG. 2) to thus ensure that each weakened portion 7 is formed between two layers 10, 11 of at least substantially identical width (as considered in the longitudinal direction of the web 5).

The distance between the location or station L and a station T (where the arms 19 engage the web 5 and cause the application of layers 10, 11 thereto) depends on a number of parameters, such as the nature of the material 18, the speed at which the web 5 is transported, the configuration of the edges 21 and/or others. The axis of rotation of the element 14 is preferably parallel to the axis of rotation of the device 15, i.e., the axes of these components are preferably located in a common plane, and such plane preferably further includes the axis of the roller-shaped applicator 13. The material 18 in the vessel 18a is assumed to be liquid stearin; however, it is equally possible to employ one or more of the aforementioned additional suitable materials in lieu of or in combination with stearin.

The operation:

The motor M is started to drive the takeup reel 16 in a counterclockwise direction (arrow 16a) whereby the web 5 begins to advance in the direction of arrow 5a to set the supply reel 12 in rotary motion in a counterclockwise direction (arrow 12a). The element 14 and the device 15 are also set in rotary motion so that the surfaces 22 travel at the speed of the edges 21 and at the speed of the web 5. This causes successive surfaces 22 to move the adjacent portions of the web 5 (namely, the trailing portion of one of the future sections 9 and the leader of another of the future sections 9) into contact with the liquid-coated peripheral surface 13a of the applicator 13 which is rotated at the speed of the web 5. The edges 21 thereupon form successive weakened portions 7 after the corresponding arms 19 (which constitute anvils or back supports for the edges 21) complete an angular movement through 180° (namely, from the station T to the station L). The diameter of the circle along which the surfaces 22 travel and the width of these surfaces can be readily selected in such a way that the length d of a web portion between two neighboring web-engaging surfaces 22 greatly exceeds the width of a surface 22, i.e., that the ratio of the width of the layers 10 or 11 to the width of sections 9 will be within the aforediscussed range (preferably less than one-third of the distance between two neighboring weakened portions 7).

It will be noted that the making of weakened portions 7 follows the making or application of the layers 10, 11. However, it is clear that the operation can be reversed by the simple expedient of adjusting the motor M so that it rotates the reel 12 in a clockwise direction, as viewed in FIG. 2. The reel 12 is than a takeup reel and the reel 16 constitutes a supply reel. In such apparatus, the making of weakened portions 7 precedes the application of layers 10 and 11. It is further clear that the device 15 can be installed to the left of the element 14 so that the arms 19 which assume the three o'clock positions (as viewed in FIG. 2) cooperate with successive edges 21 in order to form the weakened portions 7.

The placing of weakened portions 7 midway between the longer sides of the respective surfaces 22 is not critical, i.e., the width of the layers 11 can exceed the width of the layers 10 or vice versa. The use of relatively wide surfaces 22 is desirable and advantageous because this renders it even less likely that an edge 21 will strike the web 5 somewhere close to the one or the other longitudinal edge of the respective surfaces 22, i.e., that a weakened portion 7 will not be disposed between a pair of layers (10, 11).

In the apparatus of FIG. 2, the RPM of the element 14 is identical with that of the device 15 because the diameters of the circular paths of the edges 21 and surfaces 22 are identical. However, this is not critical because the number of arms 19 can be reduced to three or increased to more than four as long as one ensures that each edge 21 meets a surface 22 at the time it forms a weakened portion 7.

Once the transfer of the web 5 from the reel 12 onto the reel 16 is completed, the reel 16 can be unwound and converted into a desired number of rolls 2, depending on the desired length of convoluted web stock in each roll 2. The diameters of successive rolls 2 may but need not be identical, and the application of the adhesive coat 4 can take place while the reel 16 is converted into a succession of rolls 2.

It is equally possible to replace the reel 16 with a cylindrical core which is placed onto the shaft 16a to support or to form part of a roll 2. Such mode of operation is desirable and advantageous when the adhesive coat is applied between the station or location L and the locus of the reel 16 shown in FIG. 2 or between the reel 12 and the applicator 13. Furthermore, and as already mentioned above, the reel 16 can constitute a supply reel and the reel 12 then constitutes a takeup reel; this is desirable if the manufacturer wishes to form the weakened portions 7 prior to the application of layers 11 and/or 10.

The described method and apparatus exhibit the important advantage that they allow for continous application of layers 11 and/or 10 to selected portions of the inner side of the web 5, and also that they allow for the making of weakened portions 7 at least substantially midway between the boundaries of a composite layer including a layer 10 and a layer 11, i.e., substantially midway between the longer sides of the respective surface 22. This reduces the likelihood that the weakened portions 7 would be applied outside of the material 18 which does not tend to adhere to the adhesive coat 4. Furthermore, the apparatus is very simple, compact and inexpensive. As explained in connection with FIG. 2, the means for applying the layers 11, 10 merely includes the simple roller-shaped application 13 and the equally or relatively simple cruciform or similarly configurated element 14.

A further advantage of the method, apparatus and roll is that the latter need not be sold with any instructions, i.e., a person utilizing the roll will readily comprehend that the leaders of successive sections 9 can be peeled off by the simple expedient of engaging such leaders and pulling them in a direction substantially tangentially of the roll. Absence of adhesive at the inner sides of such leaders is of advantage on the additional ground that the adhesive is not likely to contaminate the hands of the user and/or to penetrate beneath the fingernail or fingernails in the course of removal of one or more sections when the adhesive-coated outer side is not suited for its intended purpose, e.g., when such exposed or outer side has accumulated a large amount of contaminating substances from garmets in a cleaning establishment, in a home, in a military establishment, in a seminary, in an academy, in a correctional institution or another establishment whose occupants or inmates are likely to employ such types of rolls for the purpose of cleaning or analogous purposes. Since the adhesive coat 4 is preferably applied to the outer side of each convolution of the web 5, and since the layers 11 and/or 10 are applied to the inner side of the web, the entire exposed surface of the roll 2 is provided with a coat of adhesive so that the roll can be put to use in any angular position while, at the same time, permitting rapid engagement of the leader of the foremost section 9 (at the leading edge 8) by the fingers of the operator.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of making adhesive-coated rolls, particularly rolls for cleaning garments or the like, comprising the steps of weakening spaced-apart portions of an elongated flexible web transversely of the longitudinal direction thereof so that the thus-weakened portions break in response to the application of tensional stresses thereto, and such weakened portions convert said web into a file of coherent neighboring sections each having a leader adjacent to the preceding weakened portion and a trailing portion adjacent to the next-following weakened portion; applying transversely extending layers to said leaders at a first side of said web, said layers consisting of a material which does not adhere to at least one adhesive, and one of said weakening and applying steps preceding the other; convoluting said web; and coating a second side of said web opposite said first side with said one adhesive prior to said convoluting step so as to obtain an adhesive-coated roll upon completion of said convoluting step, said convoluting step being performed in such a manner that said first side is the inner side and said second side is the outer side of said roll.

2. The method of claim 1, wherein said applying step includes simultaneously applying to said first side layers of non-adherent material to the sides of trailing portions of the sections so that each weakened portion is at least substantially surrounded by a pair of layers which do not adhere to the adhesive on the web.

3. The method of claim 1, wherein the material of said layers is selected from the group consisting of stearin, wax, wax crayon and silicone.

4. Apparatus for making a roll, particularly a roll for cleaning garments or the like, comprising a source of supply of an elongated flexible web; means for advancing the web lengthwise in a predetermined direction along an elongated path; means for weakening spaced-apart portions of the web in a first portion of said path; a source of hardenable adhesive-repellent liquid material; and means for applying longitudinally spaced layers of the liquid material extending completely across the web to one side of the web in a section portion of said path so that successive layers are immediately adjacent to at least one side of successive weakened portions, said applying means including a rotary conveyor having a peripheral surface, and engaging means for contacting spaced-apart portions of the one side of the running web with said peripheral surface, said conveyor being mounted in such a manner that a portion of said peripheral surface projects into said source of liquid material so that the latter coats, and is conveyed to the region of said engaging means on, said peripheral surface during rotation of said conveyor.

5. The apparatus of claim 4, wherein said engaging means comprises a rotary element having at least one countersurface engaging the other side of the web, during each revolution of said element, opposite one of said spaced-apart portions of said one side, said weakening means comprising at least one rotary tool arranged to weaken successive spaced-apart portions of the web while such portions are engaged by said countersurface.

6. The apparatus of claim 5, wherein said countersurface and said tool are arranged to travel along circular paths having substantially parallel axes and meeting at a location wherein said tool weakens the material of a portion of the web which is engaged by said countersurface.

7. The apparatus of claim 6, wherein said tool has an edge extending transversely of said elongated path and located substantially centrally of said countersurface during travel past said location.

8. The apparatus of claim 4, wherein said weakening means is located upstream of said applying means, as considered in said direction.

9. Apparatus for making a roll, particularly a roll for cleaning garments or the like, comprising a source of supply of an elongated flexible web; means for advancing the web lengthwise in a predetermined direction along an elongated path; means for weakening spaced-apart portions of the web in a first portion of said path; a source of hardenable adhesive-repellent liquid material; and means for applying longitudinally spaced layers of the liquid material extending completely across the web to one side of the web in a second portion of said path so that successive layers are immediately adjacent to at least one side of successive weakened portions, said weakening means being located downstream of said applying means, as considered in said direction.

* * * * *